United States Patent [19]
Cohen et al.

[11] Patent Number: 5,608,876
[45] Date of Patent: Mar. 4, 1997

[54] ADD-IN BOARD WITH ENABLE-DISABLE EXPANSION ROM FOR PCI BUS COMPUTERS

[75] Inventors: Ariel Cohen, Zichron-Yaacov, Israel; William G. Holland, Cary; Joseph F. Logan, Raleigh, both of N.C.; Avi Parash, Ramat-Yishay, Israel

[73] Assignee: International Business Machines Corporation, Armonk, N.Y.

[21] Appl. No.: 447,022

[22] Filed: May 22, 1995

[51] Int. Cl.$^6$ ........................................ G06F 13/00
[52] U.S. Cl. .......................... 395/281; 395/284; 395/830
[58] Field of Search .................................. 395/281, 284, 395/830

[56] References Cited

U.S. PATENT DOCUMENTS

| 4,340,932 | 7/1982 | Bakula et al. | 395/402 |
| 4,864,601 | 9/1989 | Berry | 379/96 |
| 5,129,069 | 7/1992 | Helm et al. | 395/497.03 |
| 5,402,528 | 3/1995 | Christopher et al. | 395/109 |

*Primary Examiner*—Jack B. Harvey
*Assistant Examiner*—Sumati Lefkowitz
*Attorney, Agent, or Firm*—Joscelyn G. Cockburn

[57] ABSTRACT

An adapter or add-in card for use in a peripheral component interconnect (PCI) computer includes a universal module which couples the card to the PCI bus. The module includes a set of selectively programmable configuration registers which are loaded by a microprocessor on the adapter. A circuit arrangement on the module issues a command which inhibits the PCI processor from accessing the configuration registers until fully loaded. Another circuit arrangement presents the Expansion ROM base address register as a 'read/write' register or a read only register with all bits set to logical "0" to the PCI computer. If the Expansion ROM base address register is presented as a read only register with all bits set to "0", the PCI computer concludes that no Expansion ROM exists on the add-in card, and its contents are not shadowed into the memory of the PCI computer. This disabling of the Expansion ROM causes memory space to be conserved in the computer. If the Expansion ROM is presented as a read/write register with non-zero values, the PCI computer concludes that an Expansion ROM exists and "shadows" its contents into the memory of the PCI computer.

18 Claims, 9 Drawing Sheets

ADD-IN BOARD WITH ENABLE-DISABLE EXPANSION ROM FOR PCI BUS COMPUTERS

CROSS REFERENCE TO RELATED PATENT APPLICATION

The present patent application Ser. No. 08/447,022, filed May 22, 1995 relates to patent application Ser. No. 08/446,390, filed May 22, 1995. Both applications are filed on the same date and assigned to a common assignee. Whereas the invention disclosed in Ser. No. 08/446,390, filed May 22, 1995 relates to a PCI interface module with programmable configuration registers, the invention disclosed in Ser. No. 08/447,022, filed May 22, 1995 relates to the PCI interface module with means to activate/deactivate the PCI ROM on an add-in board.

BACKGROUND OF THE INVENTION

1) Field of the Invention

The present invention relates to computer systems in general and in particular to devices, called adapter cards or add-in boards, for coupling a plurality of computer systems or for coupling devices to a computer system.

2) Background of the Invention

The use of a communications interface or input/output bus for coupling separate devices, such as processors, memories and peripherals, of a computer system is well known in the prior art. Computer systems are not only used to perform several stand alone tasks but also to exchange information between one another. In order to exchange information, the computer systems are connected into a computer network. The conventional computer network includes a communications medium and a plurality of computer systems connected to the communications medium. Usually, an add-in board couples the bus of the computer system to the communications medium. To make their computers more attractive to users, most manufacturers have tried to standardize the design of their computer buses. Standardized buses such as ISA, EISA, Micro Channel™, etc., are well known in the prior art.

The Peripheral Component Interconnect (PCI) bus is another one of the standardized buses. It is a high performance 32 or 64 bit bus with multiplexed address, control and data lines. The PCI bus is intended for use as an interconnect mechanism between highly integrated peripheral components, peripheral add-in boards and processor/memory subsystems. The specification for the PCI bus is set forth in the document PCI Local Bus Specification, Production Version Revision 2.0, Apr. 30, 1993. The manual is prepared and maintained by the PCI Special Interest Group (SIG). The PCI-SIG is an organization which is open for membership to all companies in the computer industry. It is believed that the PCI bus will emerge as the predominant expansion bus for add-in boards in high performance personal computers (PCIs), workstations, servers, etc.

Among the many features which the PCI specification provides is the use of an "Expansion ROM." The Expansion ROM is a read-only memory device residing on a PCI add-in board. The Expansion ROM contains code which is executed by the PCI host processor to provide initialization and system boot functions for the PCI add-in board.

The typical way in which the Expansion ROM is used is architectured in the above-referenced PCI local bus specification which is incorporated herein by reference. In the typical situation during booting of the PCI computer system, an architectured process is practiced between the PCI processor and the add-in board. As a consequence, the contents of the Expansion ROM on the add-in board is transferred into the memory of the PCI computer system. This is often referred to as the contents of the Expansion ROM being "shadowed" in the PCI computer memory. The PCI system software then executes the code from the shadowed copy of Expansion ROM in its memory. Once execution of the Expansion ROM code is complete, control is returned to the system configuration software and the PCI computer system continues with the boot process.

After this sequence (i.e., Expansion ROM code transfer and execution) is complete, the shadowed copy of the Expansion ROM remains in the host computer system's main memory. The process provides no mechanism for releasing the memory so it can be used by other applications. In today's PCI computer systems, the memory that is used to shadow the Expansion ROM is typically located in the base 1 megabyte of memory that is very constrained for DOS/Windows applications. Even if a small amount of this area is consumed, it can prevent some applications from being able to run on the computer system.

The code that is implemented in Expansion ROMs is often needed only in specialized applications. Even if the function is not needed, there is no architectured method of preventing the shadowed Expansion ROM code from occupying a portion of the computer system's main memory. The Expansion ROM must exist on all add-in boards to be available in the specialized applications that need it. A solution is needed which allows the Expansion ROM to be disabled in environments where it is not needed to prevent the computer system's main memory from being needlessly consumed by the shadowed copy of the Expansion ROM.

SUMMARY OF THE INVENTION

It is therefore, a main object of the present invention to provide a novel add-in board for use in a PCI computer.

It is another object of the present invention to provide a universal interface module for coupling different types of add-in boards to the PCI bus of a PCI bus computer.

It is another object of the present invention to provide an add-in board with Expansion ROM which can be disabled/enabled.

The add-in board according to the teachings of the present invention includes an Expansion ROM with mechanism to make the Expansion ROM available (enable) or not available (disable) to the PCI processor.

Particularly, the novel add-in board includes a sub-assembly which is specifically designed to perform a predetermined application (such as attachment to a communications network, attachment to different type devices, etc.), the universal interface module with programmable PCI configuration registers and an add-in board microprocessor. By configuring one of the PCI configuration registers called the "Expansion ROM Base Address Register," into a read/write register or a read only register set to a predetermined value, the Expansion ROM on the add-in board is shadowed into the memory of the PCI computer or not shadowed into the memory of the PCI computer.

In particular, the add-in board of the present invention includes an add-in board microprocessor with a local bus to which a non-volatile storage and the universal interface module, hereafter called the PCI bus interface chip, are coupled. A set of registers, including read/only registers are provided in the PCI bus interface chip. In addition, a small quantity(generally 2k bytes to 16k bytes) of the non-volatile storage is used as the PCI Expansion ROM which can be written in or read by the PCI processor. A PCI control ROM register and an Expansion ROM base address register are provided in the PCI bus interface chip.

Following power up, the PCI bus interface chip controller activates selected control lines on the PCI bus to indicate a "retry mode" in response to accesses to its PCI configuration registers from the PCI system processor. While in this "retry mode" the PCI system processor is prevented from accessing the PCI bus interface chip's configuration registers, and the PCI system processor is signalled that it should "retry" the register access again at a later time. During the prohibition or no-read period, the add-in board microprocessor accesses the non-volatile storage and loads the configuration registers with the information which is stored in the non-volatile storage. In addition, the add-in board microprocessor accesses the PCI control ROM register and changes the state of the PCI ROM disable bit if the Expansion ROM is to be disabled. If the Expansion ROM is to be enabled, the bit is not changed.

When the loading is completed, the add-in microprocessor activates a control bit, hereafter called the PCI access grant bit, in a control register on the PCI bus interface chip. The output signal from the bit causes the PCI bus interface controller to de-activate the previously activated control lines and as a consequence, the PCI processor is free to access the registers on the PCI bus interface chip.

If the PCI ROM disable bit was set to a logical "1", the PCI ROM disable logic forces an all logical "0" read from the PCI Expansion ROM base address register. Since the PCI processor can only read "0s" from the PCI Expansion ROM base address register, the PCI processor concludes that no Expansion ROM is provided on the add-in board.

Whereas setting the PCI ROM disable bit to a logical "1" forces the PCI Expansion ROM base register into a read only "0" state, setting the PCI ROM disable bit to a logical "0" causes the PCI Expansion ROM base register to appear as a read/write register to the PCI processor. In the read/write state, the PCI processor writes all logical "1s" into the PCI Expansion ROM base address register. If non-zero values are read back from the PCI Expansion ROM base address register, the PCI processor concludes that an Expansion ROM is provided on the add-in board and the PCI memory base address for the Expansion ROM is written into the Expansion ROM base address register. The address in the PCI Expansion ROM base addresss register is the location in the PCI processor memory where the contents of the Expansion ROM is read/written. In addition, the PCI processor initiates a read/write cycle for the PCI Expansion ROM on the PCI bus. The PCI ROM enable logic, in response to an address in the PCI Expansion ROM base address register, is activated to service the read or write to the Expansion ROM.

In another feature of the invention, the function of the PCI ROM disable bit is over-ridden by a PCI ROM disable signal which could be provided by a pin on the PCI bus interface chip. If the pin is terminated active "high", all "0s" are read from the Expansion base address register. If the pin is terminated inactive low, the setting of the PCI ROM disable bit control as is described above.

The foregoing features and advantages of this invention will be more fully described in the accompanying drawings.

DETAILED DESCRIPTION OF THE PREFERRED EMBODIMENT

Figure 1:
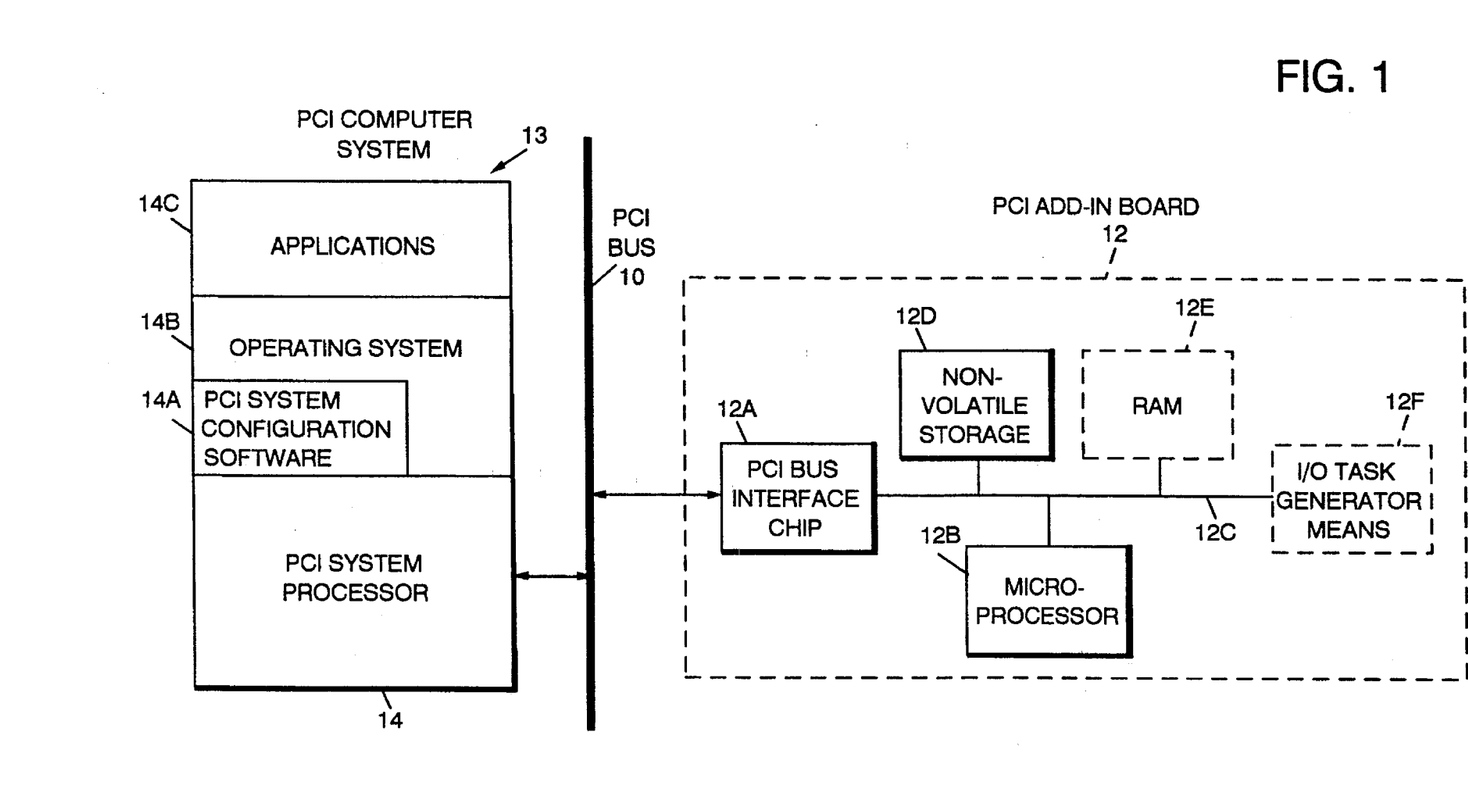
FIG. 1 shows a system level view block diagram of the PCI add-in board according to the teachings of the present invention.

FIG. 1 shows a block diagram of a PCI computer system 13. The PCI computer system is comprised of PCI bus 10, PCI add-in board 12 and PCI processor 14. The PCI processor 14 includes several software products including PCI system configuration software 14A, operating system 14B and several application programs 14C. The respective functions of the software are well-known in the art. Therefore, a detailed description of each will not be given. Suffice it to say that the PCI system configuration software 14A performs the function needed to control the configuration registers (to be described later) on the PCI add-in board 12. In general, the PCI system configuration software 14A is part of what is typically called "BIOS" (Basic Input/Output System) software which performs the power on diagnostic for the system and provides various low level routines to support system configuration and data input/output. The PCI Special InterestGroup (PCI-SIG) publishes the "PCI BIOS Specification," Revision 2.0, Jul. 20, 1993, which outlines the functions required in the PCI configuration software. The document is incorporated herein by reference. The PCI BIOS Specification sets forth sufficient information to enable a programmer to design a sutiable configuration module.

As described previously, the PCI bus 10 is an interconnect transportation mechanism for computer systems. A more detailed discussion of the PCI bus is set forth in the document "Peripheral Component Interconnect (PCI) Local Bus Specification, Apr. 30, 1993 which is incorporated herein by reference. In addition, U.S. Pat. No. 5,392,407 (Multiport Processor with Peripheral Component Interconnect Port and RAMBUS Port) describes feature of the PCI bus and is also incorporated herein for purposes of describing background information relative to the bus. Even though FIG. 1 shows the PCI add-in board 12 as being a separate unit from the PCI computing system 13 in an actual embodiment, the PCI add-in board 12 is mounted in an expansion slot under the cover of the PCI computer system 13.

Still referring to FIG. 1, the invention to be described hereinafter relates to the PCI add-in board 12 and in particular, to the PCI bus interface chip 12A, which interfaces with the PCI bus 10. The PCI bus interface chip 12A is a universal chip which can be used by vendors to interconnect different types of PCI add-in board 12 to the PCI bus. In addition, the PCI bus interface chip provides a mechanism to enable or disable the Expansion ROM which is located on the PCI add-in board. The PCI add-in board 12 includes a processor 12B with a local bus 12C. The local bus 12C interconnects the PCI bus interface chip 12A, non-volatile storage 12D, RAM 12E and Input/Output (I/O) task generator means 12F. The task generator means 12F is the subsystem of the PCI add-in board which performs required functions to effectuate a desired task. By way of example, the task generator means 12F could be a communication adapter for attaching the PCI computer system 13 to a local area network (LAN) such as token ting, ethernet, FDDI and similar types of LANs. An example of a task generator for the token ring network is the IBM Auto LANStreamer PCI Adapter, P/N 04H8095.

Similarly, a task generator for ethernet is the IBM EtherStreamer MC 32 Adapter, P/N 74G0850.

As a general statement, task generators which could be coupled to the PCI bus interface chip include communication controllers (ethernet, token ting, FDDI, ATM, etc.), display controllers (VGA, XGA, etc.), multi-media devices (video, audio, CD-ROM, etc.), disk subsystems (IDE, SCSI, RAID, etc.) and co-processor subsystems (Pentium, Power PCI, etc.).

It should be noted that these applications can all be practiced by the PCI add-in boards. According to the teachings of the present invention, the PCI bus interface chip 12A (details to be given later) can be used with any of the add-in boards and performs the bus interface function required for the add-in board to operate on the PCI bus.

Still referring to FIG. 1, the present invention covers the Expansion ROM and the mechanism (to be described later) in the PCI bus interface chip which indicates the presence or absence of said Expansion ROM to the PCI processor. In particular, the Expansion ROM is a sector in the non-volatile storage. The sector is general 2k bytes to 16k bytes. Of course, it is well within the skill of the art to use other structures and different sizes for the design of the Expansion ROM without deviating from the scope of the present invention.

The PCI system processor can execute code from the Expansion ROM to perform various functions such as initialization, configuration, and system boot functions on behalf of the add-in board. The location of the Expansion ROM within the PCI system processor's memory map is configured by the PCI system configuration program writing an address, whereat the code in the Expansion ROM is to be stored, in the PCI Expansion ROM base address register. The format and location of the PCI Expansion ROM base address register is specified within the PCI Local Bus Specification, Revision 2.0.

An example of the Expansion ROM usage follows. In the example, the Expansion ROM is used on a token ring add-in board which attaches the PCI computer systems to a token ring network.

The token ring add-in board provides an Expansion ROM which includes code for a "Remote Program Load" function. Remote Program Load provides the ability for a local area network adapter to request that the host computer system be "booted" remotely across the network from a server system. Instead of loading the operating system from a local hard drive or floppy disk, the remote program load code in the add-in board's Expansion ROM issues a request over the local area network to have a server system send a copy of the operating system. As the remote program load code receives the operating system code, it loads it into the local computer system's main memory and passes control to the operating system when complete.

The vast majority of token ring add-in board applications do not require the remote program load function because the host computer system is always booted from a local hard drive. In these applications, the technique described in this invention can be used to disable the Expansion ROM and free the shadow memory that would normally be consumed by the remote program load code. In applications that do use the remote program load function, the Expansion ROM will remain enabled and the host computer system will be booted from a remote server system.

For the token ring add-in board, the configuration input parameter which determines whether the Expansion ROM will be enabled or disabled is contained in non-volatile FLASH memory storage on the add-in board. Immediately following power on, a microprocessor on the add-in board copies a configuration bit from the FLASH memory into a register in the PCI bus interface chip which controls whether the Expansion ROM base address register is presented as "read/write" or "read-only" accessible to the PCI system configuration software. The user of the computer system may enable or disable the Expansion ROM by running a utility on the PCI computer system which updates the configuration bit in the FLASH memory.

Figure 2:
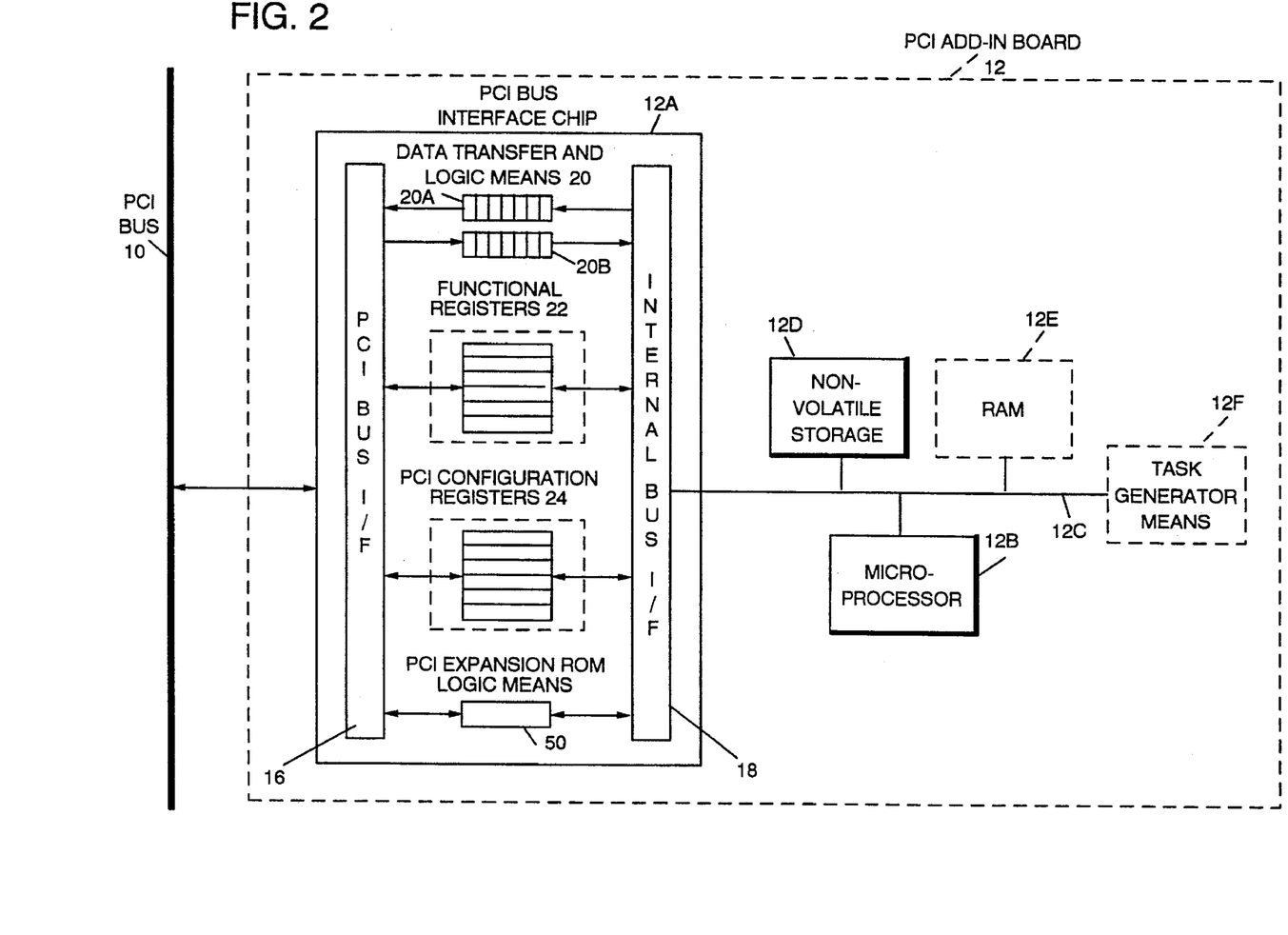
FIG. 2 shows a board level view block diagram of the add-in board according to the teachings of the present invention.

FIG. 2 shows a board level view of the PCI bus interface chip 12A. The PCI bus chip 12A includes a PCI bus interface 16 for connecting to the PCI bus 10. An internal bus interface means 18 couples the PCI bus interface chip 12A to internal bus 12C. Connected between the PCI bus interface means 16 and the internal bus interface means 18 are data transfer and logic means 20, functional registers 22, PCI configuration register 24 and PCI Expansion ROM logic means 50. The data transfer and logic means 20 is the main data transfer path between the PCI bus 10 and the PCI add-in board 12. The data transfer and logic means 20 include FIFO buffer 20A which moves data from the internal bus interface means 18 to the PCI bus interface means 16. Likewise, FIFO buffer 20B moves data in the opposite direction. The PCI configuration registers 24 can be written into and read by the PCI system processor executing the PCI system configuration software 14A (FIG. 1) over PCI bus 10. Information written into these registers configure the device resources such as I/O address, memory address, interrupt level, cache line, size, etc., of the device which the PCI add-in board couples to the PCI computer system.

Still referring to FIG. 2, the PCI configuration registers 24 include information that is critical for the configuration software 14A (FIG. 1) to be used to identify the device and understand how to properly configure it. The PCI standards requires the following list of read-only configuration registers. This list is by no means exhaustive and the invention is intended to cover the named and any other types of registers needed in interfacing a PCI add-in board to the PCI bus. Among the PCI architectured read-only registers are:

Vendor ID—a 16 bit register which identifies the vendor who manufacturers the device.

Device ID—a 16 bit register which is used by vendors to uniquely identify each of the types of PCI devices it offers.

Revision ID—an 8 bit register which can be used by vendors to identify the revision level of the device.

Class Code—a 24 bit register which identifies the generic function of the device (display controller, network controller, bridge device, etc.).

Base Address Registers—which contain read-only bits that indicate the devices I/O and memory mapping requirements.

Interrupt Line Register—an 8 bit register used to communicate interrupt line routing requirements.

Minimum Grant and Maximum Latency Timer Registers—8 bit registers which specify the devices desired settings for Latency Timer values.

As will be described below, values in the PCI configuration registers are set dynamically by the microprocessor 12B and the non-volatile storage 12D. As a consequence, the same PCI bus interface chip 12A can be used with several different types of PCI add-in boards.

As will be explained subsequently, the present invention covers the feature which enables or disables the Expansion ROM. The PCI expansion logic means 50 (details set forth below) monitors the contents of one of the configuration registers called "Expansion ROM base address register" and depending on its contents, routes information between the Expansion ROM and the PCI processor or do not route any information.

The "functional registers" 22 are those registers that are separate from the PCI configuration registers. They are accessed only by application specific software such as a token-ring device driver. They provide interrupt/status functions, DMA control functions, and configuration capabilities for options that are not specified as part of the PCI bus specification.

Figure 3:
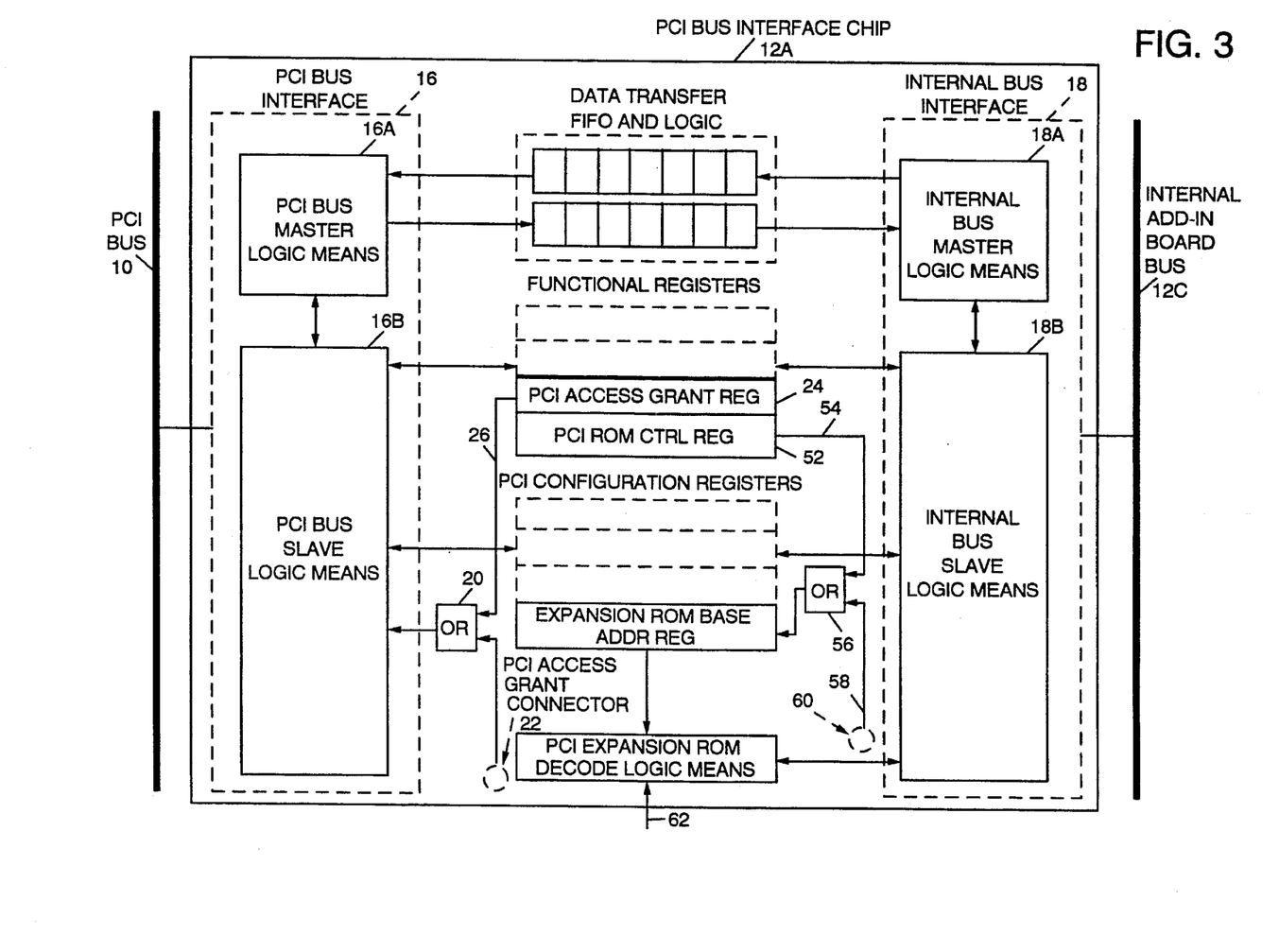
FIG. 3 shows a chip level view block diagram of the PCI interface chip according to the teachings of the present invention.

FIG. 3 shows a detailed block diagram of the PCI bus interface chip 12A interconnected to the PCI bus 10 and the internal add-in board bus 12C. In this figure, the PCI configuration registers which are programmable registers and written by the microprocessor 12B (FIG. 2) over the internal add-in board bus 12C are shown. In addition, the PCI access grant register which controls access to the PCI configuration register by the PCI processor is also shown. As will be explained subsequently in the preferred embodiment of this invention, the PCI access grant register is a one-bit register. Of course, other types of configuration registers can be used for providing the same function without departing from the scope or spirit of the present invention.

Still referring to FIG. 3, the PCI bus interface means 16 includes a PCI bus master logic means 16A and a PCI bus slave logic means 16B. The PCI bus master logic means 16A performs burst data transfers between the PCI bus 10 and FIFOs within the PCI bus interface chip. It initiates transfers on the PCI bus by requesting ownership of the bus from PCI system bus arbitration logic (not shown) which exists as part of all PCI bus systems. The PCI bus slave logic means 16B responds as a target of PCI bus cycles initiated by other bus master such as the PCI system processor. It provides the necessary handshaking of control signals on the PCI bus to allow the PCI system processor to read and write registers on the PCI bus interface chip.

Similar to the PCI bus interface 16, the internal bus means 18 includes an internal bus master logic means 18A and an internal slave logic means 18B. The internal bus master logic means 18A performs burst data transfers between the internal add-in bus 12A and FIFOs within the PCI bus interface chip. The internal bus slave logic means 18B services register read and write operations from the add-in board microprocessor.

Still referring to FIG. 3, the OR logic circuit 20 has an output connected to PCI bus slave logic means 16B and two inputs, one of which is connected over conductor 26 to the PCI access grant register 24 and the other input connected over conductor 23 to a pin or connector 22. The pin 22 is attached to the PCI bus interface module 12A and is shown schematically as a phantom circle in FIG. 3. As will be explained subsequently, when the output signal from the OR logic circuit 20 is active, the PCI processor can access the PCI configuration registers over the PCI bus. If the output from the OR circuit 20 is inactive, access to the configuration registers are blocked to the PCI processor. The state of the signal from the OR circuit 20 is controlled by a bit in the PCI access grant register which is set by the processor 12B (FIG. 2) or the pin 22 on the PCI bus interface chip 12A.

Still referring to FIG. 3, the mechanism which enables or disables the Expansion ROM is shown. The mechanism includes the PCI ROM control register 52 with an output connected by conductor 54 to logical OR circuit 56. The output from logical OR circuit 56 is connected to Expansion ROM base address register 58. The PCI Expansion ROM disable conductor 57 couples the PCI Expansion ROM disable pin 60 to another input of logic OR circuit means 56. The output from Expansion ROM base address register 58 is connected to PCI Expansion ROM decoder logic means 62. The PCI Expansion decoder logic means 62 is connected on one side to PCI bus slave logic means 16B and on the other side to internal bus slave logic means 18B.

Still referring to FIG. 3, the PCI ROM control register 52 has a bit (to be described subsequently) which is set or not set by the add-in board microprocessor over the internal add-in board bus 12C. If the bit is set to a logical "1", it forces the Expansion ROM base address register 58 to output all zeros which are read by the PCI processor which interpret the all zero reading as an indication of the absence of an Expansion ROM on the add-in board. In the event the output from the Expansion ROM base address register 58 is non-zero, the PCI processor construes this to mean that an Expansion ROM is present on the add-in board.

When the address on the PCI bus 10 is that of the address in the Expansion ROM base address register 58, the PCI Expansion ROM decode logic means 62 exchanges information from the Expansion ROM on the add-in board to the PCI processor or vice versa. A more detailed description of the structure which presents the Expansion ROM base address register as a read/write register or a read only register, with fixed zeros will be described hereinafter. Suffice it to say that by presenting the Expansion ROM base address register 58 as a read/write register or a read only register with fixed zeros, the Expansion ROM on the add-in board is made available to the PCI processor or is not made available. As will be described hereinafter, the PCI Expansion ROM disable signal which is generated on the PCI Expansion ROM disable conductor 57 can be used to override the PCI ROM control register bit.

As described above, the contents of the Expansion ROM base address register is used by the PCI processor to determine the presence or absence of an Expansion ROM on the add-in board. To this end, a description of the Expansion ROM base address register follows. The Expansion ROM base address register is architectured in Sec. 6.2.5.2 of the PCI Local Bus Specification, Rev. 2.0, which has been incorporated herein by reference. During the power-on boot sequence of the PCI computer system, the configuration software in the PCI processor writes all "1s" to the Expansion ROM base address register. If the configuration software reads back a non-zero value, then an Expansion ROM is present on the add-in board. If it reads back all zeros, then no Expansion ROM exists on the add-in board.

If an Expansion ROM is present, the system configuration software uses the value read from the Expansion ROM base address register to determine the size of the Expansion ROM. It then loads the register with the base memory address whereat the code in the Expansion ROM is to be located in the system processor's memory map. An enable bit in the register is then set to enable the PCI bus access to the Expansion ROM. The system configuration software then copies or shadows the contents of the Expansion ROM in the host computer system main memory. The add-in board Expansion ROM base address register is then written to disable access to the Expansion ROM, and the Expansion ROM is effectively removed from the system processor's memory map. Next, the system configuration software executes the code from the shadow copy of the Expansion ROM in the host computer system main memory. Once execution of the Expansion ROM code is complete, control is returned to the system configuration software and the PCI computer system continues with the boot process.

Figure 4:
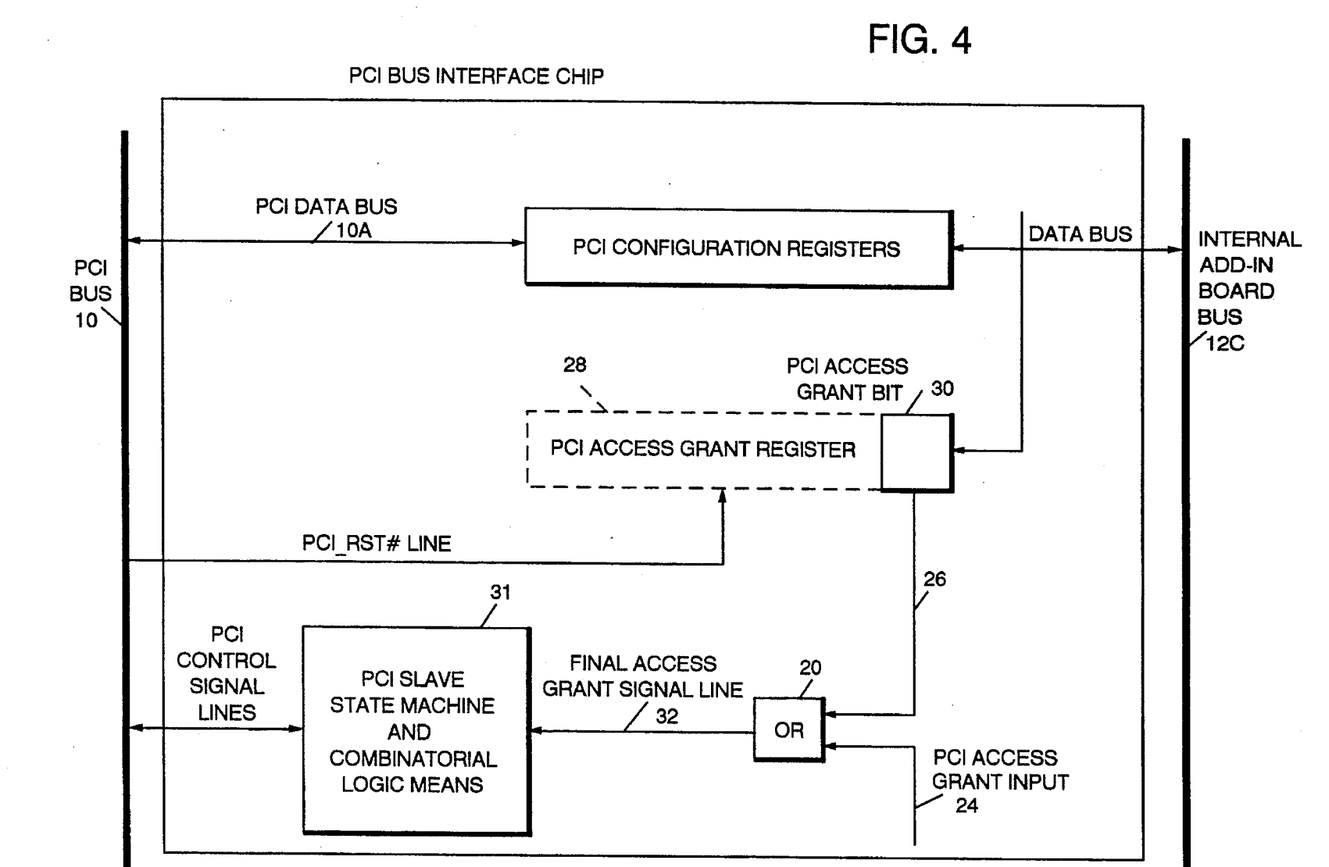
FIG. 4 shows a circuit block diagram of the PCI bus interface chip according to the teachings of the present invention.

FIG. 4 illustrates the logic which allows the microprocessor 12B (FIG. 1) to write data in the PCI configuration register while the PCI system processor 14 (FIG. 1) is inhibited from accessing the PCI configuration registers. However, once the writing is completed and the PCI access grant bit 22 is set in the PCI access grant register 28, the previously inhibited PCI processor is given permission to access all registers on the PCI bus interface chip. In addition, if the Expansion ROM is to be disabled, the PCI ROM disable bit (FIG. 9) is set to logical "1". If the PCI ROM bit is not to be disabled, the logical "0" setting of the PCI ROM disable bit is changed.

Still referring to FIG. 4, a set of the data lines (on the PCI bus called the PCI data bus 10A) interconnects the PCI configuration registers to PCI bus 10. A control architectured line called the PCI-RST # LINE interconnects the PCI access grant register 28 to the PCI bus 10. Finally, a set of PCI control signal lines necessary to activate the so-called retry function of the PCI bus, interconnects the PCI Bus 10 to the PCI State Machine and Combinatorial logic means 31.

The input to the PCI slave state machine and combinatorial logic means 31 is connected by final access grant signal line 32 to OR circuit 20. The signals on conductors 24 and 26 have already been described relative to FIG. 3 and will not be repeated here.

Figure 5:
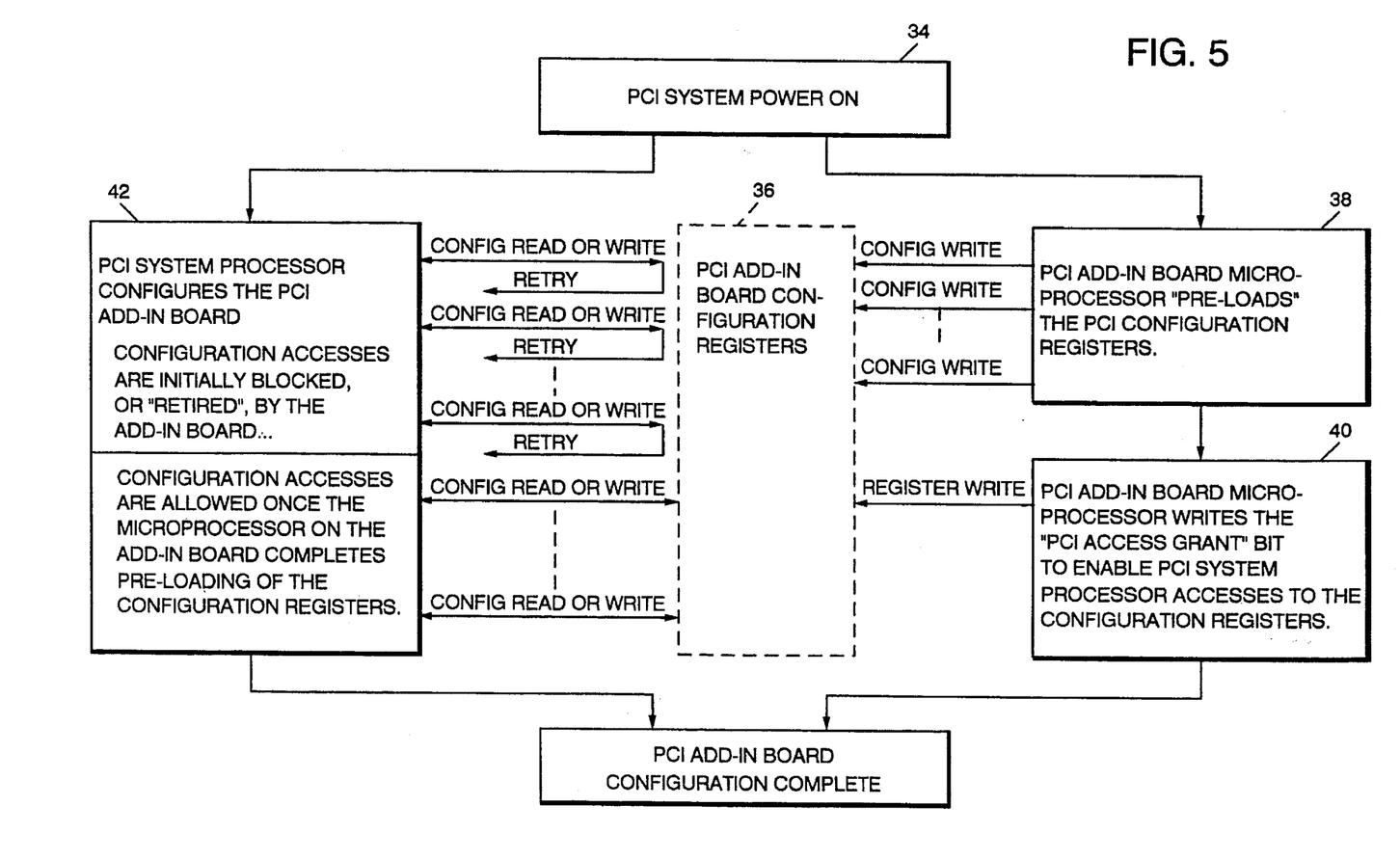
FIG. 5 shows a flow chart of process steps taken by the PCI processor and the add-in board processor, respectively, in order to configure and set the configuration registers.

FIG. 5 shows a flow chart of the interaction between the PCI system processor trying to access the PCI add-in board configuration registers and the PCI add-in board microprocessor preloading the PCI configuration registers. In summary, at power-on, the PCI system configuration software running in the PCI processor 42 tries to enter the PCI add-in board configuration registers (located in the PCI interface chip) not shown. The PCI system processor accesses are denied until the add-in board microprocessor writes the PCI access grant bit in the PCI bus interface chip. The denial allows the PCI add-in board microprocessor to complete the configuration registers preload operation before the PCI system configuration software can access the configuration registers.

More particularly, the process begins when the PCI system is powered on (block 34). The PCI add-in board with its configuration register is shown schematically by 36. Following power-on, the PCI system processor 42 attempts to access the configuration registers via the lines labeled "Config Read or Write". These attempts are disallowed and the disallowances are shown schematically by the lines labeled Retry. During this time interval, the PCI add-in board microprocessor 38 obtains information from the non-volatile ROM on the board and writes the appropriate configuration registers with the previously stored information retrieved from the non-volatile storage (block 38). Once this is completed, the PCI add-in board microprocessor (block 40) writes the PCI access grant bit which enables the PCI system processor 42 to exit from the retry mode and access the registers on the add-in board. Access to the register is indicated by the double-headed arrow labeled "Config. Read or Write" in FIG. 5. Once the function of read or write register is completed, the PCI add-in board configuration is completed and the system is now in a condition to communicate with the device which the add-in board couples to the PCI bus.

Figure 6:
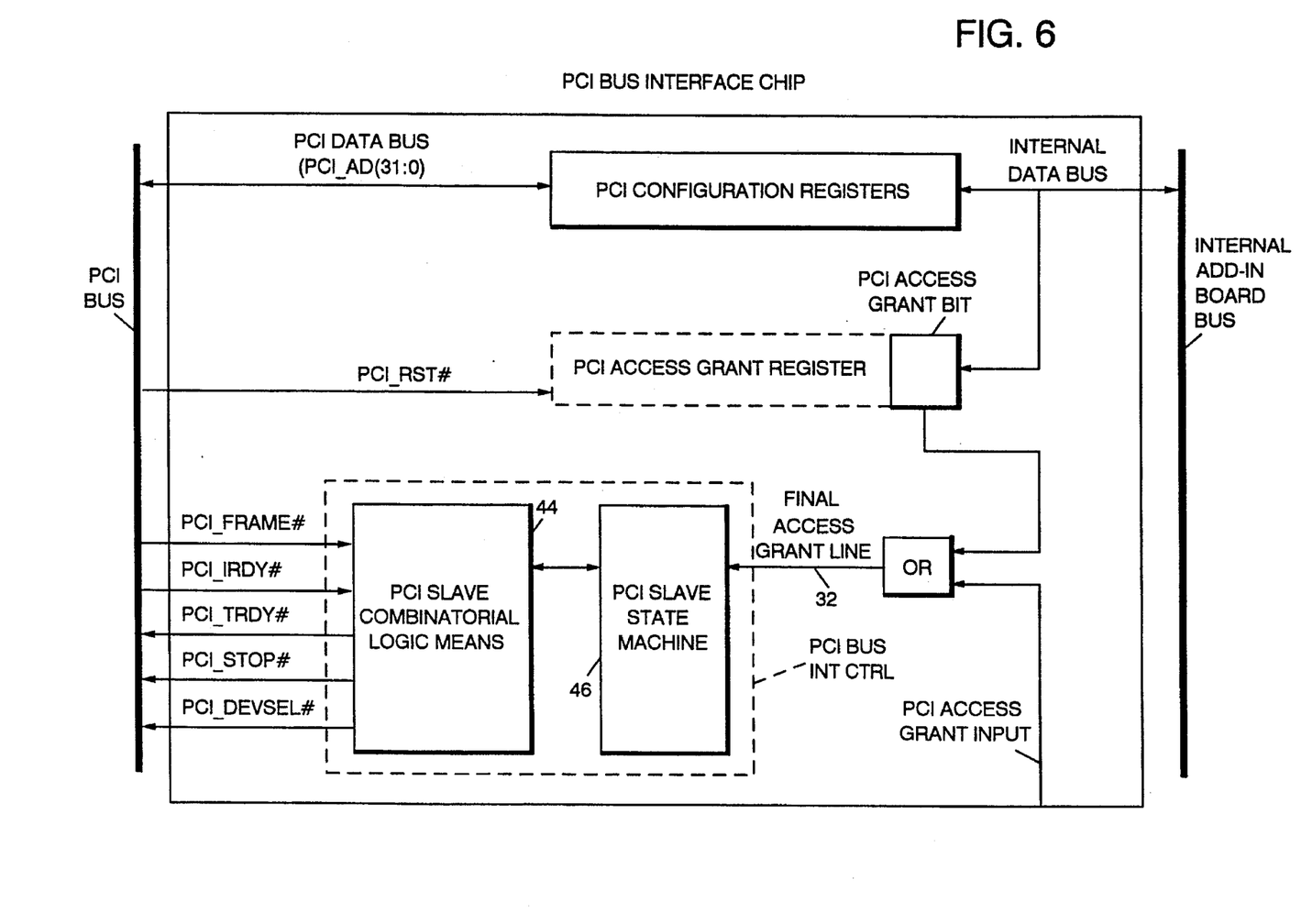
FIG. 6 shows a block diagram of the PCI bus interface chip controller.

FIG. 6 shows a block diagram of the PCI bus interface chip and the PCI bus interface controller (PCI bus Int. Ctrl.). The functions, in part, of the PCI bus interface controller are to generate the control signals which forces the PCI processor into the "Retry" state and inhibits said PCI processor from accessing the registers on the PCI bus interface chip. Components, in FIG. 6, which are similar to previously described components will not be identified or discussed. The PCI bus interface controller is comprised of PCI slave combinatorial logic means 44 and PCI slave state machine 46. The PCI slave combinatorial logic means 44 decodes control signals (PCI FRAME # and PCI IRDY #) on the PCI bus and signals the PCI slave state machine 46 that a register read or write operation has been initiated by the PCI system processor to the PCI bus interface chip. The PCI slave state machine 46 then sequences through the states required to service the read or write operation. The PCI slave combinatorial logic means 44 decodes outputs of the PCI slave state machine 46 and responds by activating control signals (PCI DEVSEL #, PCI TRDY # and PCI STOP #) on the PCI bus to signal the PCI system processor that the bus cycle has been completed.

If the final access grant signal on final access grant line 32 is in an inactive low state, the PCI slave state machine 46 will respond by signalling a "retry" condition in response to the read or write operation from the PCI system processor. Using outputs of the PCI slave state machine 46, the PCI slave combinatorial logic means 44 signals a retry condition by activating the PCI DEVSEL # and PCI STOP # signals and deactivating the PCI TRDY # signal. The PCI system processor uses the signal sequence as an indication that access to the registers has been denied and the bus transaction must be "retried" again at a later time. If the final access grant signal 32 is in the active high state, the PCI slave state machine 46 and combinatorial logic means 44 respond with a normal bus transaction by activating the PCI DEVSEL # and PCI TRDY # signals. The PCI system processor uses this signal sequence as an indication that the read or write access to the register has been completed normally. The precise signal sequences required for "retry" and normal read and write bus transactions are defined within the PCI Local Bus Specification, Production Version, Revision 2.0 which is incorporated herein by reference.

Figure 7:
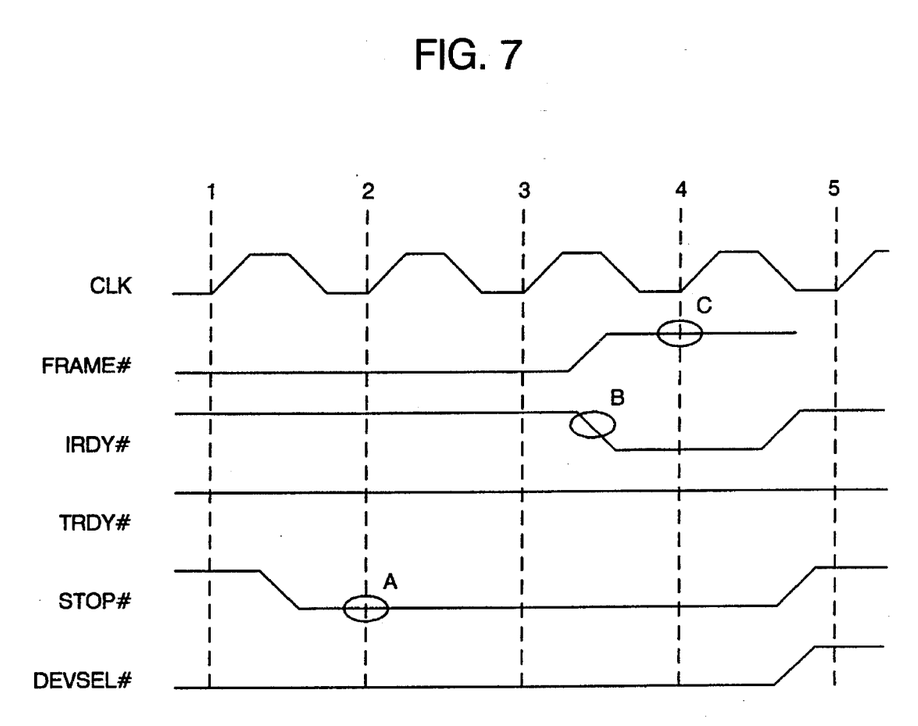
FIG. 7 shows a timing diagram for the retry cycle.

FIG. 7 shows a timing or event diagram for the hand shaking procedure which is practiced between the PCI processor and the PCI interface chip (FIG. 6). The hand shaking routine is required to force the PCI processor into a retry mode. The retry mode is invoked when a slave device such as the PCI bus interface controller is not ready to communicate with a master device such as the PCI processor. The signals required for this routine are architectured in the above-referenced PCI specification. The signals include a clock, Frame #, IRDY #, TRDY #, STOP # and DEVSEL #. The signals labeled Frame # and IRDY # are outputted on the PCI bus by the PCI processor when it desires to access the configuration register in the PCI bus interface chip. The signals labeled TRDY #, STOP # and DEVSEL # are signals generated by the PCI bus interface chip in response to the signals outputted from the PCI processor. The named signals and the direction of flow are shown in FIG. 6. The numeral 1, 2, 3, 4 and 5 indicate the period when the PCI bus interface chip samples the signal outputted from the PCI processor. Likewise, the circles labeled A, B and C indicate instances when one device initiates certain action and the reaction from the other device. For example, A is initiated by the PCI bus interface controller and B is the response from the PCI processor. When applied to the respective signals, if the signal labeled STOP # is low, the IRDY # signal is dropped and the FRAME # signal is raised. The other events showed by C operate in a similar manner. Finally, the retry cycle is completed at interval 5 and is shown by the two arrows with the arrow heads pointing in opposite directions.

Figure 9:
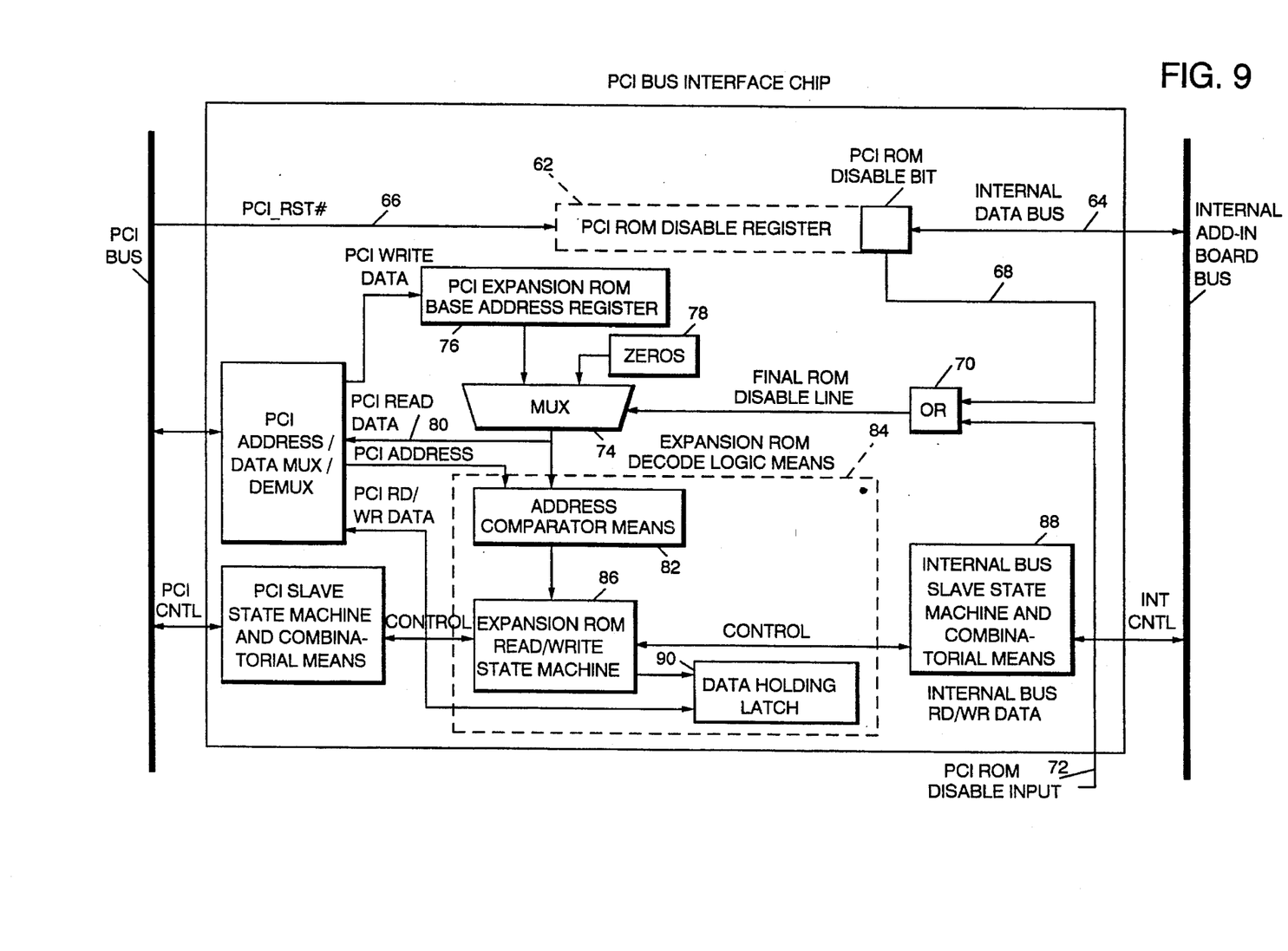
FIG. 9 shows the PCI Expansion ROM disable logic diagram.

FIG. 9 is a logic diagram for the PCI ROM disable/enable according to the teachings of the present invention. The logic is implemented in the PCI bus interface chip. Items or components in FIG. 9 that have been previously described will not be addressed further. The PCI ROM disable/enable circuit arrangement is comprised of PCI ROM Control register (Ctrl) 52. The PCI ROM Ctrl register 52 is coupled by internal bus read/write data line 64 to the internal add-in board bus. As will be explained subsequently, a bit called "PCI ROM disable bit" in the register can be set by the internal add-in board processor. If set to 1, it causes the add-in Expansion ROM not to be recognized by the PCI processor. The PCI-RSD # control line 66 resets the PCI ROM Ctrl register 52. The PCI ROM disable bit is connected by conductor 68 to logical OR circuit means 70. Another input to logical OR circuit means 70 is the PCI ROM disable input signal on the PCI ROM disable input 72. As stated previously, this input is from the pin 60 (FIG. 3) on the PCI bus interface chip. The output from logical OR circuit means 70 is connected over final ROM disable line 71 to MUX 74. The MUX 74 is connected to PCI Expansion ROM base address register 76 and a source 78 which forces all logical 0s into MUX 74. There are a plurality of ways in which "0s" can be forced into MUX 74. For example, tying the input to a low voltage level would force "0s" into the multiplexer 74. The output from MUX 74 is fed over PCI read data line 80 into address comparator means 82. The address comparator means 82 is part of the Expansion ROM decode logic means 84.

Still referring to FIG. 9, the Expansion ROM Decode logic means 62 further includes Expansion ROM read/write state machine 86 which is connected by control lines to internal bus slave state machine and combinatorial logic means 88. The internal bus slave state machine and combinatorial logic means 88 is connected by internal control lines to the internal add-in board bus. The Expansion ROM read/write state machine 86 is also connected to data holding latch 90. The data holding latch means 90 is connected over internal data bus 64 to the internal add-in board bus. The PCI Address Data MUX/DEMUX 92 is coupled over the named lines to the PCI Expansion ROM base address register 76, the address comparator means 82 and the data holding latch means 90. Finally, the PCI Slave State Machine and Combinatorial logic means 31 interconnect to the Expansion ROM read/write state machine 86 to the control lines on the PCI bus. The PCI slave state machine and combinatorial logic means 31 have already been described and further description or discussion about this logic block will not be given here.

The function and operation of the components in FIG. 9 will now be described. The logic shows how the microprocessor on the add-in board internal bus can control whether the PCI Expansion ROM base address register appears as a read/write register or a read-only register with all bits fixed to 0s. To recapitulate, an Expansion ROM a small quantity (generally 2k bytes to 16k bytes) of non-volatile storage which resides on a PCI add-in board can be directly read and written by the PCI system processor. The PCI system processor can execute code from the Expansion ROM to perform various functions such as initialization, configuration and system boot functions on behalf of the add-in board. The location of the Expansion ROM within the PCI system processor's memory map can be configured by the PCI system configuration program by writing the Expansion ROM base address to the PCI Expansion ROM base address register.

The PCI ROM Ctrl register 52 is a register within the PCI bus interface chip that can be read or written by the add-in board microprocessor over the internal add-in board data bus. In one embodiment of the present invention, the register includes only a single bit called the PCI ROM disable bit. The PCI ROM disable bit is reset to a logical "0" state by the PCI-RST # signal when the PCI system is powered on. The PCI-RST # signal is an architectured signal that is present on all PCI bus systems.

The PCI Expansion ROM base address register can be read and written by the PCI system processor. Likewise, the PCI ROM disable bit can be written by the add-in board processor. ON a read operation, the PCI ROM disable bit controls the read data which is returned from the PCI Expansion ROM base address register to the PCI system processor. When in the "0" state, the PCI ROM disable bit signals the multiplexer logic 74 to return the true contents of the PCI Expansion ROM base address register. In this mode, the PCI Expansion ROM function is enabled and the PCI system processor will be able to read back any value it writes to the register. The microprocessor on the add-in board's internal bus may disable the PCI Expansion ROM function by writing the PCI ROM disable bit to a logical "1". In this mode, the multiplexor logic always gates out logical 0s and the read of the Expansion ROM base address register returns 0s regardless of what value is written to the register.

The data output of the multiplexor also feeds the Expansion ROM decode logic means 62. If the data output of the multiplexor is all 0s, the decode logic is disabled and no Expansion ROM function is supported. If the data output of the multiplexor is non-zero, the Expansion ROM decode logic compares the current PCI bus address to the contents of the Expansion ROM base address register to determine if the Expansion ROM is being accessed by the PCI system processor. If an address match is detected, then the Expansion ROM read/write state machine 86 is activated to service the read or write operation to the Expansion ROM. As previously stated, the address in the Expansion ROM Base Address Register would have been loaded by the PCI processor.

If the PCI system processor reads the Expansion ROM, the Expansion ROM read/write state machine initiates a read cycle to non-volatile storage on the add-in board's internal bus to fetch the read data. It captures and temporarily holds the data in a data holding latch means 90 until the necessary handshaking takes place to allow the data to be passed to the PCI system processor on the PCI data bus. If the PCI system processor writes the Expansion ROM, the Expansion ROM read/write state machine temporarily captures the write data from the PCI data bus and initiates a write operation to the non-volatile storage on the add-in board's internal data bus. The Expansion ROM read/write state machine interacts with the PCI slave state machine and combinatorial logic means and internal bus slave state machine and combinatorial logic means to provide the handshaking required to transfer the data between the two buses.

For applications that do not include a microprocessor on the add-in board, an alternate method of forcing zeros to be read from the PCI Expansion ROM base address register is provided. The PCI ROM disable input 72 to the PCI bus interface chip would normally be terminated inactive "low" to allow the PCI ROM disable bit to control the value read from the register. But if a microprocessor is not available, the PCI ROM disable input can be terminated active "high" to cause the PCI Expansion ROM base address register to read zeros. The state of the PCI ROM disable input is logically ORed with the state of the PCI ROM disable bit to produce the signal, on final ROM disable line 71, which controls the multiplexor logic 74.

Figure 8:
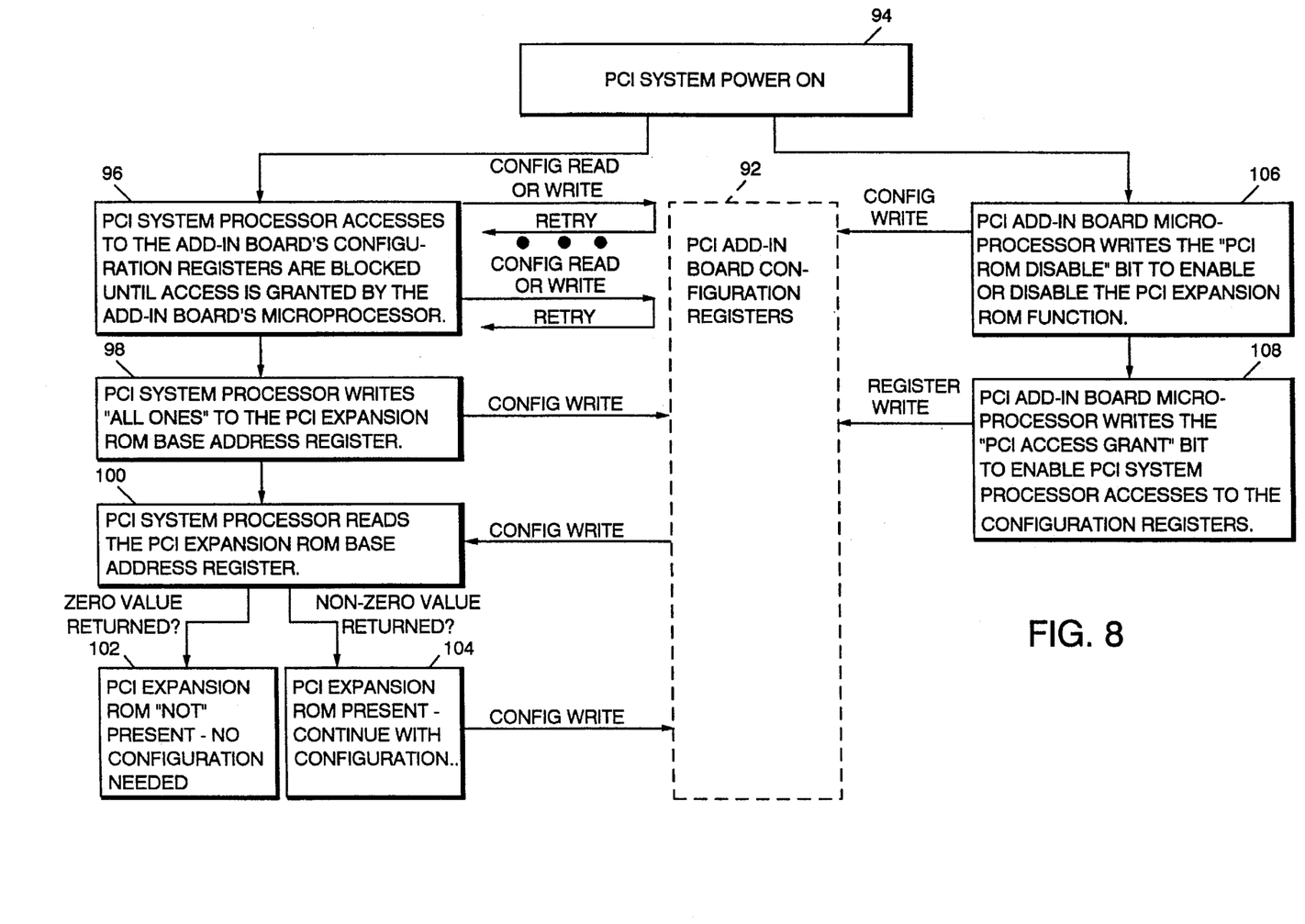
FIG. 8 shows a flow chart for the PCI Expansion ROM enable/disable process according to the teachings of the present invention.

FIG. 8 shows a flow chart of the interaction between the PCI system processor, the add-in board configuration registers and the add-in board microprocessor. For purposes of the enable/disable Expansion ROM function, the PCI add-in board configuration registers are labeled 92. The action performed by the PCI system processor is shown on the left-hand side of the figure and the action undertaken by the add-in board microprocessor is shown on the right-hand side of the figure. Co-action between the respective processor and the registers are shown by arrow. The arrow labeled "retry" indicates a situation where the PCI processor is forced in the retry mode and is not allowed to access the configuration registers. The process is started at power-on of the PCI system (block 94). The process then descends into block 96 where the PCI system processor attempts to access the PCI add-in board configuration registers and the attempt is blocked by the controller on the PCI interface chip previously described. The accessing of the registers is shown by the line labeled Config Read or Write and the blocking is shown by the arrow labeled Retry. The process then descends into block 98 where access is given to the PCI system processor which writes all 1s in the PCI Expansion ROM base address register. The process then descends into block 100 where the PCI system processor reads the PCI Expansion ROM base address register. The process then descends into blocks 102 or 104. If the value read in the register is all zeros, the process descends into block 102 and the system processor concludes that no ROM is present and, therefore, there is no need for configuration. If the value read from the ROM base address register is non-zero, the process descends into block 104 where the PCI system processor concludes that there is an Expansion ROM and subsequently configures and transfers the contents of the ROM to its own memory.

Still referring to FIG. 8, during the period when the PCI system processor is excluded from accessing the PCI configuration register, the PCI add-in board microprocessor (block 106) writes the PCI ROM disable bit to enable or disable a PCI Expansion ROM function. The program then descends into block 108 where the PCI add-in board microprocessor writes the PCI access grant bit to enable the PCI system processor access to the configuration registers.

Operation

The operation of the invention will now be described. The invention provides programmable configuration registers for use in the add-in board of a PCI computer system. In summary, the microprocessor 12B (FIG. 1) on a PCI add-in board is made to pre-load unique values into the add-in board read-only PCI configuration register before said registers are accessed by the PCI system configuration software. As a consequence, a common PCI bus interface chip can be used across add-in boards that are produced by multiple vendors and implement different types of functions. The invention als oprovides for enabling or disabling the Expansion ROM on the add-in board.

In particular, the microprocessor and non-volatile storage are usually part of the inherent components on the add-in board. The microprocessor and non-volatile storage are located on the internal add-in board bus 12C. This bus is isolated from the PCI bus by the PCI bus interface chip. When the PCI system is powered on, a signal on the PCI-RST # Line (FIG. 4) sets the PCI access grant bit 30 to zero. Simultaneously, the PCI slave state machine and combinatorial logic 31 which is the controller on the PCI bus interface chip activates selected ones of the PCI Control Signal Lines which causes the PCI processor to enter the so-called "Retry Mode" and will not access the registers on the PCI bus interface chip.

In the meantime, when the PCI processor is denied access to the registers on the PCI interface chip, the microprocessor 12B executes code, following power-on reset of the PCI system, which reads the assigned read-only PCI configuration register values from programmed location in the non-volatile storage 12D (FIG. 1). For example, the non-volatile storage could be flash, RAM, ROM, etc. The microprocessor then writes the unique values to the PCI configuration register within the PCI bus interface chip. At this time, the PCI ROM disable bit is also set to a logic "1" if the Expansion ROM is to be disabled. The PCI Expansion ROM disable bit is left in its logical "0" state if the Expansion ROM is to be enabled. To release the retry condition which causes the PCI processor not to access the configuration or any other registers in the PCI bus interface chip, the microprocessor writes the PCI access grant bit 22 (FIG. 4). Writing this bit causes the final access signal on Final Access Grant Signal Line 32 to become active and the PCI slave state machine and combinatorial logic means 31 deactivates the previously activated PCI control signal lines. This, in turn, allows the PCI processor to access the configuration registers. All access to these registers are controlled by the PCI system configuration software 14A running on the PCI system processor 14 (FIG. 1).

It may be desirable to also use the PCI bus interface chip in applications where no microprocessor or no non-volatile storage exists on the add-in board. It may also be desirable to use the chip in a dedicated application where the precise values contained in the read-only configuration registers are not critical. In either case, the invention permits the function of the PCI access grant bit to be overridden by input pin 22 (FIG. 4) on the PCI bus interface chip. If the PCI access override pin is terminated to its inactive high state, the PCI access override input pin will permit retries of PCI configuration access to be controlled by the PCI access grant bit as described above. If terminated to its active low state, the PCI access override input pin will override the function of the PCI access grant bit and permit all configuration access from the PCI bus to be serviced normally without retry. In this case, the power-on default values of the read-only PCI configuration registers are used and the ability to load unique values is not supported.

Although a preferred embodiment of the present invention has been described and disclosed in detail, other modifications and embodiments thereof which would be apparent to one having ordinary skills are intended to be covered by the spirit and scope of the appended claims.

I claim:

1. An add-in board for using in a PCI computer system comprising:

a first bus;

a subassembly task generator means, coupled to the first bus, for performing predetermined functions to accomplish a desired task;

a non-volatile storage coupled to the first bus, said non-volatile storage containing an Expansion ROM for storing code to be executed by a processor not connected to the first bus;

an on-board microprocessor coupled to the first bus, said on-board microprocessor configuring the add-in board to allow the processor not connected to the first bus access or no access to the Expansion ROM;

a PCI bus interface chip for interconnecting to the first bus and a second bus, said PCI bus interface chip including at least one control register with at least one bit to be activated by the on-board microprocessor;

a PCI Expansion ROM base address register accessible by the processor not connected to the first bus; and a logic means being responsive to the logical state of the at least one bit for allowing a predetermined bit pattern to be outputted from the PCI Expansion ROM base address register wherein the predetermined bit pattern is an indication of no Expansion ROM to the processor not connected to the first bus.

2. The add-in board of claim 1 wherein the processor not connected to the first bus is a PCI processor located in the PCI computer system.

3. The add-in board of claim 1 or 2 wherein the subassembly task generator means performs predetermined functions to accomplish desired tasks of a communication controller which attaches said PCI system to a LAN.

4. The add-in board of claim 3 wherein the LAN includes ethernet, token ring, FDDI or ATM.

5. The add-in board of claim 1 or 2 wherein the subassembly task generator means performs predetermined functions to accomplish desired tasks of a device controller.

6. The add-in board of claim 5 wherein the device controller controls display, multimedia subsystem, disk, subassembly or co-processor subsystems.

7. The add-in board of claim 1 wherein the Expansion ROM occupies from 2k bytes to 16k bytes of the non-volatile storage.

8. The add-in board of claim 1 wherein the second bus includes a PCI bus.

9. The add-in board of claim 1 wherein the logic means includes a logical OR circuit.

10. The add-in board of claim 9 further including a multiplexor circuit means (MUX) having an input coupled to PCI Expansion ROM base address register;

a means for providing the predetermined bit pattern connected to another input of the MUX; and a PCI address/data MUX/DEMUX interconnecting the output of said multiplexor circuit means to the PCI bus.

11. The add-in board of claim 10 further including an Expansion ROM decode logic means coupled to the output of the multiplexor circuit means and the PCI address/data MUX/DEMUX, said Expansion ROM decode logic means monitoring the multiplexor circuit means and PCI address/data MUX/DEMUX and if an address in said multiplexor circuit means matches an address outputted from said PCI address/data MUX/DEMUX, executes a read or write of the PCI Expansion ROM.

12. The add-in board of claim 9 wherein the predetermined bit pattern includes all logical 0s.

13. The add-in board of claim 10 further including a conductor means interconnecting a pin on the add-in board and an input to the OR logic circuit.

14. An interface subsystem for coupling an add-in board to the PCI bus of a PCI computer comprising:

at least one control register with at least one bit to be set to a first state if an Expansion ROM on said add-in board is to be disabled;

a register means for receiving and storing a first predetermined bit pattern generated by the PCI computer, with said first predetermined bit pattern indicating the availability of the Expansion ROM;

a means for generating a second predetermined bit pattern, indicating the Expansion ROM is not available;

a selection circuit means for selecting the first predetermined bit pattern or the second predetermined bit pattern in response to the state of a control signal; and a logical means for monitoring the state of said at least one bit, and if said at least one bit is set to a first predetermined state, setting the control signal to a first electrical state wherein the selection circuit means selects the second predetermined bit pattern and forwards said second predetermined bit pattern to the PCI computer which examines the second predetermined bit pattern, and if set to a first predetermined value, indicates the presence of no Expansion ROM on said add-in board.

15. The interface subsystem of claim 14 wherein the first predetermined state includes a logical "1".

16. The interface subsystem of claim 15 wherein the first predetermined value includes logical "0s".

17. The interface subsystem of claim 14 further including if the at least one bit is set to a second predetermined state, setting the control signal to a second electrical state wherein the selection circuit means selects the first bit pattern and forwards said first bit pattern to the PCI computer which examines the first bit pattern and if set to a second predetermined value, indicates the presence of an Expansion ROM on said add-in board.

18. The interface subsystem of claim 17 wherein the second predetermined value includes logical "1s".

* * * * *